Feb. 21, 1961  F. J. BINGLEY  2,972,278
OPTICAL INTERFEROMETRIC POSITION INDICATION
Filed Aug. 26, 1957  3 Sheets-Sheet 1

INVENTOR.
FRANK J. BINGLEY
BY
Carl H. Synnestvedt
AGENT

INVENTOR.
FRANK J. BINGLEY
BY

AGENT

Feb. 21, 1961 F. J. BINGLEY 2,972,278
OPTICAL INTERFEROMETRIC POSITION INDICATION
Filed Aug. 26, 1957 3 Sheets-Sheet 3
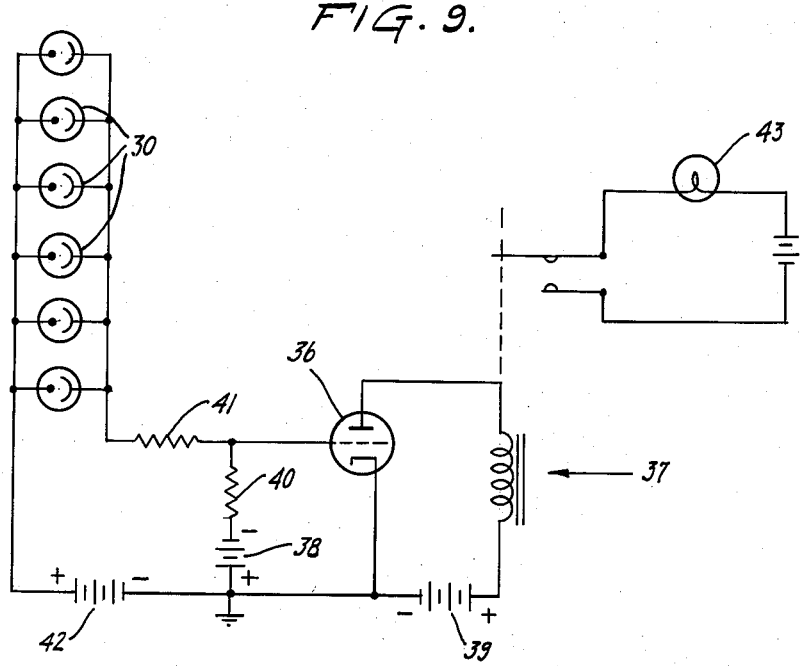
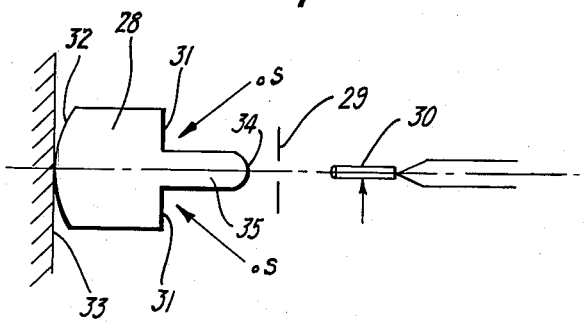
INVENTOR.
FRANK J. BINGLEY
BY
AGENT United States Patent Office 2,972,278
Patented Feb. 21, 1961

2,972,278
OPTICAL INTERFEROMETRIC POSITION INDICATION

Frank J. Bingley, Meadowbrook, Pa., assignor to Philco Corporation, Philadelphia, Pa., a corporation of Pennsylvania Filed Aug. 26, 1957, Ser. No. 680,286
2 Claims. (Cl. 88—14)

This invention relates generally to the field of position indication, and more particularly to improved means for indicating the position of an object relative to a fixed point of reference.

While of broader applicability the invention hereinafter described has particular utility when employed in the fabrication of cathode ray tubes for color television apparatus. Accordingly, the objects sought to be attained, and the features characteristic of this invention are described with reference to this particular field of application.

The luminescent screen of a typical color tube comprises repetitive arrays or "triplets" of vertical stripes of red, blue and green phosphors, each such triplet being only a few mils in width and each phosphor line being precisely registered with respect to adjacent abutting lines. In order to obtain the desired accuracy of location the phosphor pattern is photographically reproduced from a line master which comprises a transparent plate containing the desired raster configuration for each particular colored phosphor stripe. The inner face of the color tube is ultimately made up of these differently colored phosphor lines in sufficiently close relation to be visually unresolvable at normal viewing distances and yet far enough apart to permit resolution of each line by the writing electron beam.

The tube fabrication procedure relative to the laying down of the phosphor lines embodies photoresist techniques, and basically comprises imaging the desired pattern depicted on the line master onto the light sensitized surface of the tube face, each colored phosphor requiring its own individual line master. The process is complicated by the necessity of removing the tube from the projection system after each exposure for purposes of processing each individual systems of lines.

Obviously the precision with which successive arrays of phosphors may be laid down is dependent on maintenance of a fixed positional relationship between the respective line masters and the tube face relative to the optical axis of the projection system. The precision of location necessitated by this repeated withdrawal and replacement of the tube will be more fully appreciated when it is realized that the slight distortion induced by merely manually pressing the tube against a steel locating stop during processing may result in sufficient color error to be noticeable in the performance of the finished product.

The most accurate method, currently in use, of locating the tube and its respective line master plate within the projection system is that of employing a number of pressure responsive indicators, the indicators being adjusted to register a predetermined reading when the line master plate and tube are in proper alignment with the optical axis of the system.

In addition to lacking the optimum desired sensitivity, these indicators are dependent, for continuous satisfactory performance, on certain operative elements such as springs, bearings, etc., maintaining prescribed physical characteristics. The physical characteristics of such elements are unfortunately subject to variation by a complex of uncontrollable conditions and as such unpredictable. Indicators employing such elements are consequently somewhat unreliable when used for extensive periods of time in the absence of continual adjustment.

It is therefore a primary object of this invention to provide position indicating means which eliminates the inherently unreliable aspects of prior art devices and which introduces a degree of precision heretofore unattainable.

It is a further object of this invention to provide a contact sensing device or position indicator which has no moving parts and which is unaffected, from all practical standpoints, by variations in ambient conditions.

The above mentioned and other objects within contemplation will be readily understood by reference to the accompanying detailed description and drawings, in which:

Figure 8 shows one arrangement permitting remote contact indication; and

Figure 9 shows circuitry adapted to facilitate the automatic indication of contact, remotely.

Briefly described, this invention teaches the determination of the position of an object based on electromagnetic wave interference phenomena resulting when the object being positioned is brought into abutment with an appropriately shaped, light transmissive contact sensing element. In accordance with the invention the light reflected from the two confronting surfaces is made to produce an interference pattern, of the kind commonly referred to as "Newton's Rings," and advantage is taken of the fact that the pattern is characteristic of the location of the object being positioned relative to the surface of the contact sensing element. When two such surfaces are brought together the thickness of the thin film of air which is formed between them is very small at the point of contact, gradually increasing in thickness as one proceeds outwardly from the point of contact. The loci of points of equal thickness are circles concentric with the point of contact. Such a film is found to exhibit interference bands produced in the same way as the colors exhibited by an oil film on water. As will be fully understood from what follows, when reflected light is used to irradiate the area of contact, the center of the interference pattern, namely, that area in which contact is established, is black. The preferred practice of this invention is to utilize this absense of light as an indication of contact. It should be understood, that the term contact as used herein is to be given a broad connotation and is to be construed as encompassing that degree of proximity measurable in fractions of a wavelength of light.

Another approach at contact indication, utilizing the same basic principles, is to measure the diameter of the various light rings to indicate the thickness of the air firm existing between the contacting bodies to thereby establish their precise positional relationship.

Figure 1:
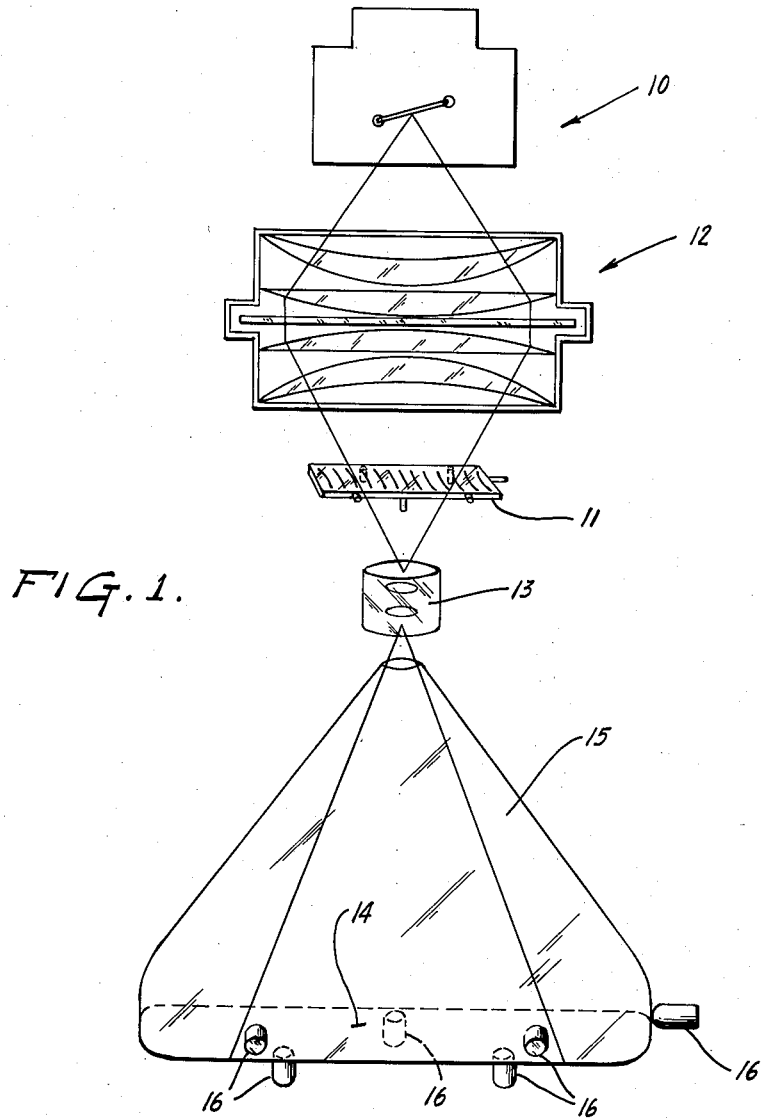
Figure 1 is a somewhat diagrammatic representation of a color tube fabricating process utilizing apparatus in accordance with the present invention.

Now making detailed reference to the drawing, and initially to Figure 1 thereof, there is shown a projection system of the type utilized in fabricating color picture tubes, comprising a high pressure mercury arc light source 10, the light from which is focused on the master plate 11 by the wide apertured condensing lens 12. The plate 11, contains a miniaturized version of the desired phosphor pattern and, by means of the wide angle projection lens 13, this pattern is imaged on the light sensitized face of the cathode ray tube 14.

The master plate 11 and cathode ray tube 15, are shown positioned within the projection system, their precise location being insured by their abutment with contact sensing elements 16, the preferred configuration of which takes the form shown in Fig. 1, and comprises a spherical ended cylinder, made of glass, synthetic sapphire or other suitable material.

One of the most critical aspects of color tube manufacture concerns the accurate positioning of the tube and master plate within the projection system and it is with reference to this particular problem that the present invention is principally considered. To insure optimum kinematic stability of the objects being located, in this instance the master plate 11 and tube 15, requires the use of six individually spaced locators for each object, this being the requisite number of indexing positions to insure adequate restraint of all degrees of freedom. It will of course be understood that the number of locating positions employed and their mode of application is dependent on numerous collateral considerations, the chosen embodiment being merely illustrative of a particularly advantageous use of the invention, and in no way limitative thereof.

Figure 2:
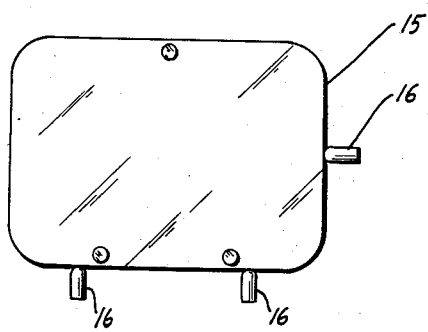
Figure 2 is a bottom view of the cathode ray tube shown in Fig. 1 depicting a preferred arrangement of contact-sensing elements.

In the illustrated embodiment, three out of each set of six contact sensing elements are arranged to make contact with the lower surface of the object being located, two of these three elements being arranged, for example, to make contact with the forward edge of the tube face as viewed in Fig. 1, while the remaining element is desirably positioned to form an equilateral triangle with the other two. The precise arrangement is subject to considerable latitude of choice. Ideally the contact sensing elements should be arranged to encompass the largest possible area without being so far apart as to make contact with the bulb on the relatively short radius near the edge. The remaining three contact sensing elements of each set can be located as shown clearly in Fig. 1, making contact at positions along two mutually perpendicular surfaces, the spacing between elements being sufficient to insure adequate stability. Figure 2 is a view looking at the under surface of the tube, showing one such desirable arrangement of contact sensing elements designed to afford optimum stability.

Figure 3:
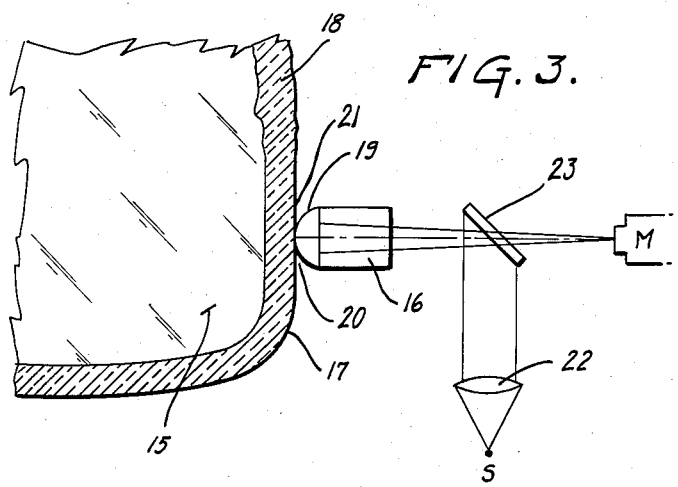
Figure 3 illustrates an arrangement of contact indicating means using reflected light.

Figure 3 shows a preferred location of the sensing element 16 on the side of the tube. The element should be above the sharp corner radius but not on the mold seam 17, which may be a thin easily fractured ridge of glass. Moreover the element or locator should not be positioned in the sealing zone 18, as the glass in this region may show sharp surface irregularities. It may be desirable in certain instances to polish the surface 21 confronting the contact sensing surface 19 in order to insure proper seating of the surfaces and/or to eliminate excessive scattering of the illuminating light beams.

Figure 4:
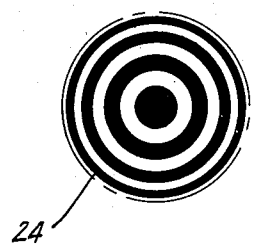
Figure 4 shows the light interference wave pattern resuling from the use of reflected light as shown in Fig. 3 and as viewed using a low powered microscope.

The contact sensing element is most clearly shown in Figure 3 and, when electromagnetic radiation of visible wavelength is employed, is desirably made of glass, synthetic sapphire or other suitable optical material. The spherical end 19 provides the contact sensing portion, while the opposite flat end serves as a viewing stage for the optical phenomena. An air film or wedge 20 is formed between the convex surface 19 and the relatively plane surface 21 of the tube 15. The air film is then illuminated by any suitable source S, the light being collimated by a lens 22 which focuses the beam of light on the half silvered mirror or thin glass plate 23, which partially reflects the light onto the air film 20. The resulting optical phenomena, brought about by interference of the reflected light, may be observed by the naked eye or more conveniently by a low powered microscope M, which is focussed on the region including the point of contact between the surfaces 19 and 21. The air film possesses radial symmetry about the point of contact, so that a locus of constant film thickness is a circle and the fringes are therefore concentric rings. The interference pattern 24 shown in Figure 4 is that observed through the microscope M using reflected monochromatic light, the area of contact, namely the center of the interference pattern being dark. The area of this dark central zone is a function of the wavelength of the light being used and the radius of curvature of the convex surface 19, the dimensions of this central dark area being readily adjusted to meet particular requirements by merely modifying one or the other of these controlling parameters, preferably and most effectively by modifying the lens radius of curvature.

In certain applications, it may be desirable or necessary to use monochromatic light of prescribed wavelength. A specific example of such an application is the use of polyvinyl alcohol as the light sensitive material in the process of laying down the phosphor line on the face of a cathode ray tube used for color television apparatus. This material is sensitive to most colors of the visible spectrum with the notable exception of red. It is consequently desirable in such cases to use a light of wavelength outside the sensitive region for positioning the tube with respect to the contact-sensing elements. The principles of this invention are of course applicable whether polychromatic or monochromatic light is used, the only practical distinction being that when, for example, reflected white light is used the only area in which complete destructive interference occurs, resulting in a complete absence of light, is in the area of contact, while in the case of monochromatic light destructive interference results in an alternating pattern of light and dark annuli. In either event the absence of light in the zone of contact indicates that the object being positioned is within five or six millionths of an inch of contacting the surface delineating its desired location. When this predetermined central area of darkness obtains at a particular locating station the object is accurately positioned in relation thereto.

Figure 5:
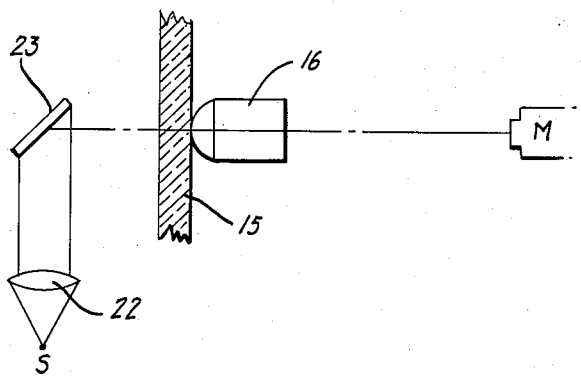
Figure 5 shows an alternative arrangement of contact indicating means employing transmitted light.
Figure 6:
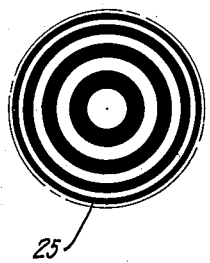
Figure 6 shows the interference pattern resulting from use of the arrangement shown in Fig. 5, as seen under low power magnification.

An alternative approach, using transmitted light, in contradistinction to reflected light, is that shown somewhat diagrammatically in Figure 5, the fringe pattern 25 shown in Fig. 6 taking the form of alternating dark and bright rings, the area of contact in this particular application being bright as a result of constructive wave interference.

The inverse fringe pattern, shown in Fig. 6, in which contact is indicated by an area of light, can likewise be attained, using reflected light, by employing a contact sensing element or lens 16 of refractive index less than that of the glass plate and filling the intervening space with oil or other suitable substance of intermediate refractive index. Such an arrangement results in the light from both the top and bottom of the film undergoing a 180° change in phase on reflection and consequently the interference pattern characteristic of contact is bright. This result can be explained by the fact that, in general, when a light wave traveling in a medium of a certain index of refraction is reflected from the surface of another medium having a greater index of refraction the phase of the electric vector in the reflected wave differs by 180° from its phase in the incident wave.

It should be understood that, in its broader aspect, this invention is not limited to the use of electromagnetic radiation of visible wavelength but may also employ electromagnetic radiation outside the visible spectrum, the primary distinction in such a case being in the mode of detecting the resulting interference wave pattern.

Figure 7:
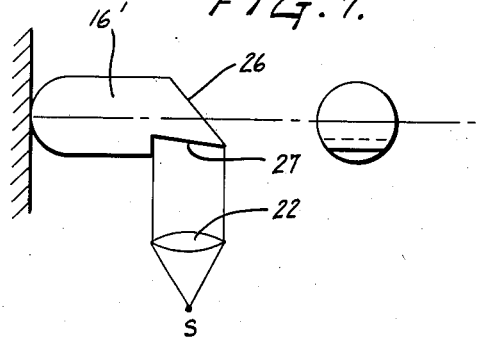
Figure 7 depicts an alternate embodiment of contact sensing element.

A modified sensing element is shown in Figure 7, the surface 26 of the obliquely truncated cylindrical portion of the sensing element or lens 16 serving as a reflecting surface, replacing the reflector element required in the arrangement shown in Figure 3. The lens is further provided with the plane surface 27 in order to prevent excessive scattering of the incident light and consequent reduction in the available energy. It should be noted that when employing a sensing element of the general configuration here shown, care must be taken to avoid total internal reflection, this of course being easily avoided by proper angular adjustment of the surface 26 relative to the emerging light beam.

In order to facilitate rapid and accurate positioning of the cathode ray tube 15 and indexing master plate 11, it is desirable to provide means adapted to indicate proper positioning automatically and remotely. Figure 8 shows one arrangement for accomplishing this objective, comprising a modified contact sensing lens 28, an apertured diaphragm or stop 29, and a photoconductive element or cell 30. The lens 28 has spaced shoulders 31 designed to refract the beam of light emanating from a source S onto the air wedge between the confronting surfaces 32 and 33, the convex surface 34, of the centrally located projecting portion 35 serving as a magnifying lens to enlarge the fringe pattern resulting from light wave interference.

The stop 29 serves to precisely define that portion of the interference pattern exposed to the pattern detecting means, here taking the form of photocell 30. By suitably positioning the stop 29 with respect to the magnifying lens 34, contact between the surfaces 32 and 33 results in the complete exclusion of light from the photocell 30. This absence of light is then sensed or detected by the photocell through the circuitry shown in Figure 9 thereby providing automatic and remote indication of contact. This circuit is particularly designed for use in conjunction with a Clairex crystal photocell type CL-3 which is extremely sensitive in the red and near infrared spectral region. To facilitate a clearer understanding of this aspect of the invention representative values of the various circuit components are indicated, it being understood that numerous modifications and arrangements are possible utilizing the teachings of this invention.

Apparatus designed to yield satisfactory results is that shown in Figure 9, the circuitry consisting of a triode 36, for example a 6C4, whose load 37 is a Potter and Brumfield relay, model LM5, having a 25,000 ohm coil, the triode being biased to cut off by the 25 volt battery 38 and having a plate voltage of 100 volts supplied by the battery 39.

The photocells 30 are connected in parallel and arranged such that when one or more of them are energized, as for example during that period of time in which contact has not yet been established, the resulting current flow develops a voltage across the one megohm resistor 40 sufficient to overcome the fixed cut off bias of the battery 38. The one megohm resistor 41 serves to limit the current when one or more photocells are conducting. The 125 volt battery 42 is used in combination with battery 38 to impress a potential of 100 volts across the photocells. If contact is not established at a particular location the photocell at that location will be energized resulting in tube conduction which in turn closes the relay 37 energizing the light 43. When satisfactory location is established all photocells are quiescent, the tube 36 cut off and the light 43 is out.

While a preferred embodiment, illustrative of the apparatus and method concepts of the present invention has been depicted and described, modifications may be made therein without departing from the spirit of the scope of the present invention. It will be understood, therefore, that such changes and modifications are contemplated as come within the scope of the appended claims.

I claim:

1. Apparatus for positioning a cathode ray tube within a color processing projection system of the type described, comprising: a plurality of fixed, transparent, glass-like locators, three of said locators forming a triangle to provide a stable base upon which to support the face of said tube within said system and three other of said locators positioned to contact frontal perimeter portions of said tube along generally mutually perpendicular sides of the bulb thereof for insuring complete kinematic stability of said tube on placement thereof within said system, said locators cooperatively delineating the desired position of said tube within said projection system and having contact sensing surfaces of generally convex configuration such that when brought into close proximity with confronting portions of said tube there is produced a predictable interference pattern of light waves which is characteristic of the position of said tube relative to each of said contact sensing surfaces; means for illuminating the general area of contact between said tube and each of said surfaces; and means for observing the resulting optical phenomenon thereby to accurately position said tube within said projection system.

2. Apparatus for positioning a cathode ray tube within a color processing projection system of the type described, comprising: a plurality of fixed, transparent, glass-like locators, three of said locators forming a triangle to provide a stable base upon which to support the face of said tube within said system and three other of said locators positioned to contact frontal perimeter portions of said tube along generally mutually perpendicular sides of the bulb thereof for insuring complete kinematic stability of said tube on placement thereof within said system, said locators cooperatively delineating the desired position of said tube within said projection system and having contact sensing surfaces of generally convex configuration such that when brought into close proximity with confronting portions of said tube there is produced a predictable interference pattern of light waves which is characteristic of the position of said tube relative to each of said contact sensing surfaces; means for illuminating the general area of contact between said tube and each of said surfaces; photoelectric means for detecting the resulting interference wave pattern, and means associated with said last mentioned means but remote therefrom for automatically indicating the simultaneous registration of said tube with each of said locators.

References Cited in the file of this patent

UNITED STATES PATENTS

| | | |
|---|---|---|
| 2,591,666 | Barkas et al. | Apr. 8, 1952 |
| 2,718,811 | Riepert et al. | Sept. 27, 1955 |

FOREIGN PATENTS

| | | |
|---|---|---|
| 595,940 | Great Britain | Dec. 23, 1947 |
| 717,242 | Great Britain | Oct. 27, 1954 |